United States Patent [19]
Bivens et al.

[11] Patent Number: 4,810,403
[45] Date of Patent: Mar. 7, 1989

[54] HALOCARBON BLENDS FOR REFRIGERANT USE

[75] Inventors: Donald B. Bivens, Kennett Square, Pa.; Helen A. Connon, Wilmington, Del.

[73] Assignee: E. I. Du Pont de Nemours and Company, Wilmington, Del.

[21] Appl. No.: 152,799

[22] Filed: Feb. 5, 1988

Related U.S. Application Data

[63] Continuation-in-part of Ser. No. 60,077, Jun. 9, 1987, abandoned.

[51] Int. Cl.$^4$ .............................................. C09K 5/04
[52] U.S. Cl. ...................................... 252/67; 62/102; 62/112; 62/114; 252/364
[58] Field of Search ................ 252/67, 364; 62/102, 62/112, 114

[56] References Cited

U.S. PATENT DOCUMENTS

| | | | |
|---|---|---|---|
| 2,641,579 | 6/1953 | Benning | 252/67 |
| 3,812,040 | 5/1974 | Borchardt | 252/68 |
| 4,303,536 | 12/1981 | Orfeo et al. | 252/67 |
| 4,482,465 | 11/1984 | Gray | 252/67 |
| 4,495,776 | 1/1985 | Nikolsky et al. | 62/114 |
| 4,562,995 | 1/1986 | Enjo et al. | 252/67 |

FOREIGN PATENT DOCUMENTS 60-13880 of 1985 Japan ...................................... 252/67

Primary Examiner—Robert A. Wax
Attorney, Agent, or Firm—James E. Shipley

[57] ABSTRACT

A unique refrigerant containing three or more halocarbons, each halocarbon after the first having a successively higher boiling point. The refrigerant has a temperature/pressure relation substantially equal to FC-12. Also provided is a method for producing cooling and a method for producing heating using this refrigerant.

9 Claims, No Drawings

HALOCARBON BLENDS FOR REFRIGERANT USE

This application is a continuation-in-part Ser. No. 060,077, filed June 9, 1987, abandoned.

BACKGROUND OF THE INVENTION

This invention relates to refrigerant compositions for cooling and heating applications, and specifically relates to ternary and higher blends of halocarbons.

Concern over the ozone depletion potential of certain halocarbons has resulted in a search for alternative compounds having lower ozone depletion potentials. Dichlorodifluoromethane is the most widely used refrigerant and is expected to be subject to reduced usage because of its high ozone depletion potential.

In refrigeration applications, and more specifically in automobile air conditioning systems, refrigerant is often lost through leaks during operation, such as through shaft seals, hose connections and solder joints. In addition, refrigerant may be released to the atmosphere during maintenance procedures performed on refrigeration equipment.

Most commercial refrigerants which are now used are pure fluids or azeotropes; many of these refrigerants have ozone depletion potential when released to the atmosphere. Some nonazeotropic mixtures of refrigerants may also be used but they have the disadvantage of changing composition when a portion of the refrigerant charge is leaked or discharged to the atmosphere. Should these mixtures contain a flammable component, they could also become flammable due to the change in composition which occurs during the leakage of vapor from refrigeration equipment. Refrigeration equipment operation could also be adversely affected due to this change in composition and vapor pressure which results from fractionation.

What is needed, therefore, are substitute refrigerants which maintain important refrigerant properties of vapor pressure and nonflammability over a wide range of compositions, while also having reduced ozone depletion potential.

SUMMARY OF THE INVENTION

What has been discovered is a unique refrigerant comprising about 10 to 60 weight percent of a first halocarbon having a boiling point at atmospheric pressure in the range of about $-50°$ C. to about $-30°$ C., about 10 to 60 weight percent of a second halocarbon having a boiling point at atmospheric pressure in the range of about $-30°$ C. to about $-5°$ C., and about 10 to 75 weight percent of a third halocarbon having a boiling point at atmospheric pressure in the range of about $-15°$ C. to about $30°$ C.; said second halocarbon being higher boiling than said first halocarbon and said third halocarbon being higher boiling than said second halocarbon; said halocarbons containing at least one fluorine atom; at least one of said halocarbons containing a hydrogen atom; said first and third halocarbons being nonflammable; said first, second and third halocarbons and their proportions being chosen such that the resulting refrigerant is nonflammable and has a vapor pressure substantially equal to the vapor pressure of dichlorodifluoromethane over the temperature range of about $0°$ C. to about $100°$ C.; said refrigerant having substantially lower ozone depletion potential than the ozone depletion potential of dichlorodifluoromethane.

Preferably, the components of the new refrigerant will have normal boiling points in the range of $-50°$ C. to $10°$ C. Preferably too, at least two of the halocarbons will bear hydrogen and fluorine atoms on the same carbon atom. Further, when only one of the halocarbons bears hydrogen and fluorine on the same carbon atom, it will preferably be the intermediate boiling compound. There may be more than one carbon atom bearing hydrogen and fluorine atoms in the same molecule, as in $CHF_2CHF_2$ (FC-134).

It will be appreciated that each of said "first halocarbon", "second halocarbon" and "third halocarbon" may consist of more than one halocarbon boiling in the stated range.

Also provided by this invention is a method for producing cooling that includes condensing the refrigerant of the instant invention and thereafter evaporating it in a heat exchange relationship with a body to be cooled.

Finally, there is provided a method for producing heating that involves condensing the refrigerant in a heat exchange relationship with a body to be heated and thereafter evaporating it.

DETAILED DESCRIPTION OF THE INVENTION

By refrigeration is meant the utilization of physical change in a substance to produce a cooling or heating effect. The physical change can be, for example, a change from the solid state to the liquid state or a change from the liquid state to the vapor state or the reverse order.

By refrigerant is meant the substance which undergoes physical change in refrigeration.

By ozone depletion potential is meant the ratio of the calculated ozone depletion in the stratosphere resulting from the emission of a compound compared to the ozone depletion potential resulting from the same rate of emission of FC-11 which is set at 1.0. A method of calculating ozone depletion potential is described in "The Relative Efficiency of a Number of Halocarbons for Destroying Stratospheric Ozone", by D. J. Wuebbles, Lawrence Livermore Laboratory report UCID-18924, January, 1981, and "Chlorocarbon Emission Scenarios: Potential Impact on Stratospheric Ozone", by D. J. Wuebbles, Journal Geophysics Research, 88, 1433-1443, 1983.

By nonflammable is meant a gas mixture in air will not burn when subjected to a spark igniter as described in "Limits of Flammability of Gases and Vapours," Bulletin 503, H. F. Coward et al., Washington, U.S. Bureau of Mines, 1952.

By "vapor pressure substantially equal to the vapor pressure of dichlorodifluoromethane" (FC-12) is meant a vapor pressure which is plus or minus twenty-five percent of the vapor pressure of FC-12 at the same temperature over the temperature range of about $0°$ C. to about $100°$ C. The vapor pressure of FC-12 is described in "Handbook of Chemistry and Physics", 50th Edition, page D-163.

By substantially lower ozone depletion potential than the ozone depletion of dichlorodifluoromethane is meant an ozone depletion potential at least fifty percent less than the ozone depletion potential of dichlorodifluoromethane.

The refrigerant of the present invention contains at least three halocarbons and is useful in compression cycle applications including air conditioner and heat pump systems and is useful for producing both cooling and heating. The refrigerant of the present invention can be used in refrigeration applications as described in U.S. Pat. No. 4,482,465 to Gray, which patent is incorporated herein by reference.

It has been found that at least one of the halocarbons of the instant invention should contain a hydrogen atom. One reason for this is that if the halocarbon contains chlorine, inclusion of a hydrogen atom will cause that halocarbon to break down in the atmosphere so that ozone depletion is reduced.

As mentioned above, when a refrigerant composition contains a flammable component, the possibility of either the discharged vapor or the remaining refrigerant upon leakage becoming flammable, constitutes a highly undesirable safety hazard. The present composition can be so formulated that the lowest boiling and the highest boiling halocarbons are nonflammable so that even when the intermediate boiling component(s) is flammable, not only is the original composition nonflammable, but additionally, neither the leaking vapor nor the remaining refrigerant becomes flammable.

The present invention provides ternary and higher blends of halocarbons which surprisingly have a vapor pressure/temperature relation substantially equal to that of the refrigerant FC-12; in addition, certain blends of the instant invention retain the close match to the FC-12 vapor pressure/temperature relation even after substantial evaporation losses, e.g., up to 50% of the original refrigerant charge or more. A vapor pressure/temperature relation similar to that of the refrigerant FC-12 is particularly desirable since existing refrigeration equipment which has been designed to use FC-12 can also be used with the present refrigerant with little or no modification. The refrigerant of the instant invention can include or exclude FC-12 as a component.

In addition, it has been discovered that the present refrigerant can be easily formulated to contain a flammable component as the second halocarbon such that the refrigerant will not become flammable throughout evaporation of the entire refrigerant.

Finally the refrigerant has ozone depletion potential significantly below that of FC-12.

It has been discovered that three or more halocarbons can be blended in such proportions that the resulting vapor pressure/temperature relation is substantially equal to that of FC-12 over the normal refrigerant operating range of 0° C. to 100° C. and even after substantial evaporation of a refrigerant charge.

The components of the refrigerant are chosen from halocarbons which have a boiling point range at atmospheric pressure of about −50° C. to about +30° C. The useful halocarbons include fluorinated carbon compounds of from one to four carbon atoms and may also contain hydrogen, chlorine and bromine atoms. The preferred halocarbons are listed in the Table. Included in the Table are data for FC-12 primarily for comparison purposes.

TABLE

| Refrigerant No. | Chemical Formula | Boiling Point °C. | Ozone Depletion Potential |
| --- | --- | --- | --- |
| FC-32 | $CH_2F_2$ | −51.7 | 0 |
| FC-125 | $CHF_2CF_3$ | −48.5 | 0 |
| FC-143a | $CF_3CH_3$ | −47.6 | 0 |
| FC-22 | $CHClF_2$ | −40.8 | 0.05 |
| FC-218 | $CF_3CF_2CF_3$ | −39 | 0 |
| FC-115 | $CClF_2CF_3$ | −38.7 | 0.3 |
| FC-12 | $CCl_2F_2$ | −29.8 | 0.9 |

TABLE-continued

| Refrigerant No. | Chemical Formula | Boiling Point °C. | Ozone Depletion Potential |
| --- | --- | --- | --- |
| FC-134a | $CF_3CH_2F$ | −26.5 | 0 |
| FC-152a | $CHF_2CH_3$ | −24.7 | 0 |
| FC-134 | $CHF_2CHF_2$ | −19.7 | 0 |
| FC-22B1 | $CHBrF_2$ | −15 | — |
| FC-124 | $CHClFCF_3$ | −12 | 0.05 |
| FC-124a | $CHF_2CClF_2$ | −10 | 0.05 |
| FC-142b | $CClF_2CH_3$ | −9.2 | 0.05 |
| FC-C318 | $C_4F_8$ | −6.1 | 0 |
| FC-114 | $CClF_2CClF_2$ | 3.6 | 0.6 |
| FC-114a | $CCl_2FCF_3$ | 3 | — |
| FC-143 | $CHF_2CH_2F$ | 5 | 0 |

The blends of the instant invention are typically made up using at least three compounds from the Table. The important concept is that the blends are made up of a low boiling compound (boiling point range of about −50° C. to about −30° C.), an intermediate boiling compound (boiling point range of about −30° C. to about −5° C.), and a high boiling compound (boiling point range of about −15° C. to about 30° C.).

Depending on the degree of interaction among the components of the blends, we have found that the vapor pressure/temperature relation of the blends is relatively unchanged over a wide range of compositions that occur when vapor is allowed to leak from a suitable container holding the liquid blend and equilibrium vapor. As earlier stated, this is an important finding, as this indicates that a refrigerant charge of a ternary (or higher) blend can retain the close vapor pressure match to FC-12 even though a substantial amount, e.g., 50% of the charge is lost via a vapor leak. This results in an important advantage over binary blends which could have a greater change in vapor pressure for a similar loss of weight. An example of a blend that exhibits this type of behaviour is a blend of FC-22, FC-152a and FC114 with initial liquid weight percent values of 40% , 20% and 40% , respectively.

There is an additional advantage of a ternary (or higher) blend of the present concept in that a blend containing a flammable compound as an intermediate boiling halocarbon can continue to be nonflammable during composition changes caused by vapor leaks. The intermediate boiling halocarbon of the above ternary blend is FC152a, a flammable compound. Blends of FC-22 and FC152a are flammable above a FC152a concentration of 25%. Blends of FC114 and FC152a are flammable above a FC152a concentration of 30%. For the above ternary blend, we found that the blend never reached the flammable concentration of FC152a, even when the vapor above the liquid was allowed to leak to complete liquid evaporation. This illustrates another surprising finding for the ternary blend: if the blend is chosen such that the flammable component is the intermediate boiler, then the compositions can be adjusted so that the blend will not become flammable during vapor loss. This is because the initial vapor leaking is rich in the low boiling, nonflammable component, and the vapor leaking subsequently is rich in the high boiling, nonflammable component. Binary blends containing flammable components could eventually become flammable during a continuing vapor leak. Again, this behaviour allows the ternary (or higher) blends to have advantages over binary blends for commercial refrigeration applications.

The above ternary blend also provides a 70% reduction in ozone depletion potential as compared to that of FC-12. This is based on a simple weight ratio of the component ozone depletion potential values. This reduction is highly significant, as the industry is searching for alternative fluorocarbon compounds that will have less potential adverse effect on the ozone layer.

The preferred blend of the present invention is about 30–40 wt. percent FC-22, about 15–25 wt. percent FC152a, and about 30–40 wt. percent FC-114. The more preferred blend is about 40 wt. percent FC-22, about 20 wt. percent FC152a, and about 40 wt. percent FC-114. The most preferred blend is about 36 wt. percent FC-22, about 24 wt. percent FC-152a, and about 40 wt. percent FC-114.

There are other ternary and higher blends having these desirable characteristics that could be formulated by those skilled in the art from the halocarbons defined and exemplified herein.

For example, other blends that may be formulated for the purposes of this invention are:

| Blend Components | Respective Liquid Weight Percent Values |
|---|---|
| FC-125, FC-134a, FC-124 | 20, 40, 40 |
| FC-125, FC-152a, FC-318 | 25, 20, 55 |
| FC-22, FC-134, FC-318 | 35, 25, 40 |
| FC-115, FC-134, FC-318 | 50, 30, 20 |
| FC-115, FC-152a, FC-143 | 50, 20, 30 |
| FC-22, FC-152a, FC-143 | 40, 20, 40 |
| FC-22, FC-142b, FC-114 | 40, 25, 35 |

In addition, more than one halocarbon can be selected from each of the temperature ranges. The objective of this description is not to identify every possible blend composition, but to illustrate our discovery of the unexpected properties that the ternary (or higher) blends can take on, depending on the components, the interaction between the components, and the chosen compositions.

The refrigerant of the instant invention can be prepared by a simple mixing process as is well known to those skilled in the art.

Specific examples of the present invention will now be set forth. Unless otherwise stated, all percentages are by weight. It is to be understood that these examples are merely illustrative and in no way are to be interpreted as limiting the scope of the invention.

EXAMPLE 1

A blend was prepared consisting of liquid concentrations of 40% FC-22, 20% FC-152a, and 40% FC-114. The ozone depletion potential of the blend was calculated to be 0.26, a 70% reduction compared with FC-12 having an ozone depletion potential of 0.9. The vapor pressure of the blend was within 15% of the vapor pressure of FC-12 over the temperature range of 0°–100° C. At 23.5° C., the blend had a vapor pressure of 98 psia compared with a vapor pressure of 90 psia for FC-12.

To illustrate the surprisingly small change in vapor pressure with compositional changes that occur during vapor leaks, vapor was allowed to leak from a suitable container holding the liquid blend and equilibrium vapor. After 53% of the initial blend charge had been lost via the vapor leak, the liquid composition had changed to 29% FC-22, 19% FC-152a, and 52% FC-114. The vapor pressure had decreased to 87 psia at 22.8° C., being within 3% of the FC-12 vapor pressure.

To illustrate the nonflammability of the blend, liquid and vapor samples were analyzed during the vapor leak tests at blend charge weight losses of 10, 25, 50, 75, and 98%. The highest FC-152a concentration was 23.3% in the vapor at 75% weight loss. At this point, the total vapor content was 33.3% FC-22, 23.3% FC-152a, and 43.4% FC-114. The lower flammability limit at this composition of FC-22, FC-152a and FC-114 is 30% FC-152a; therefore, with only 23.3% FC-152a, the mixture was nonflammable.

EXAMPLE 2

Another blend was prepared consisting of liquid concentrations of 32.4% FC-22, 13.2% FC-152a, and 54.4% FC-114. The ozone depletion potential was calculated to be 0.34. The vapor pressure of the blend was 91 psia at 24° C., matching that of FC-12. After 50% of the initial blend charge was lost via a vapor leak, the liquid composition had changed to 18.8% FC-22, 9.9% FC-152a, and 71.3% FC-114. The highest FC-152a concentration was 16.7% in the vapor at 50% weight loss, again being a nonflammable blend.

EXAMPLE 3

More than three halocarbons can be combined to create a blend having the important properties described in this invention. A blend was prepared consisting of liquid concentrations of 50% FC-22, 15% FC-152a, 15% FC-142b, and 20% FC-114. The ozone depletion potential of the blend was calculated to be 0.15, an 83% reduction in ozone depletion potential when compared to that of FC-12. At 22.8° C., the blend vapor pressure was 100 psia which compares to a vapor pressure of 90 psia for FC-12 at the same temperature. After 60% of the initial blend charge had been lost via the vapor leak, the liquid composition had changed to 32.2% FC-22, 15.6% FC-152a, 21% FC-142b, and 31.2% FC-114. The vapor pressure had decreased to 87 psia at 24.0° C., within 4% of the vapor pressure of FC-12 at that temperature which is 91 psia.

EXAMPLE 4

Another blend was prepared consisting of liquid concentrations of 54.2% FC-22, 9.6% FC-152a, and 36.2% FC-124. The ozone depletion potential of the blend was calculated to be 0.04, a 96% reduction in ozone depletion potential compared to that of FC-12. The blend vapor pressure was 93 psia at 20.8° C. which compares to a vapor pressure of 86 psia for FC-12 at the same temperature. After 68% of the initial blend charge was lost via a vapor leak, the vapor pressure had decreased to 84 psia at 22.8° C., within 7% of the FC-12 vapor pressure of 90 psia.

EXAMPLE 5

Another blend was prepared consisting of liquid concentrations of 37.0% FC-22, 23.9% FC-142b and 39.1% FC-114. The ozone depletion potential of the blend was calculated to be 0.26 a 71% reduction in ozone depletion potential compared to FC-12. The blend vapor pressure was 87.7 psia at 22.5° C. which compares to a vapor pressure of 88.2 psia for FC-12 at the same temperature.

We claim:
1. A refrigerant comprising about 10 to 60 weight percent of a first halocarbon having a boiling point at atmospheric pressure in the range of about −50° C. to about −30° C., about 10 to 60 weight percent of a second halocarbon having a boiling point at atmospheric pressure in the range of about −30° C. to about −5° C., and about 10 to 75 weight percent of a third halocarbon having a boiling point at atmospheric pressure in the range of about −15° C. to about 30° C.; said second halocarbon being higher boiling than said first halocarbon and said third halocarbon being higher boiling than said second halocarbon; said halocarbons containing at least one fluorine atom; at least one of said halocarbons containing a hydrogen atom; said first and third halocarbons being nonflammable; said first, second and third halocarbons and their proportions being chosen such that the resulting refrigerant is nonflammable and has a vapor pressure substantially equal to the vapor pressure of dichlorodifluoromethane over the temperature range of about 0° C. to about 100° C.; said refrigerant having substantially lower ozone depletion potential than the ozone depletion potential of dichlorodifluoromethane, said refrigerant excluding dichlorodifluoromethane.

2. The refrigerant of claim 1 wherein at least two of said halocarbons contain both fluorine and hydrogen atoms on the same carbon atom.

3. The refrigerant of claim 1 wherein the second halocarbon is a halocarbon containing both fluorine and hydrogen atoms on the same carbon atom.

4. The refrigerant of claim 1 wherein at least one halocarbon is selected from the group consisting of $CH_2F_2$, $CHF_2CF_3$, $CF_3CH_3$, $CHClF_2$, $CF_3CF_2CF_3$ and $CClF_2CF_3$; at least one halocarbon is selected from the group consisting of $CF_3CH_2F$, $CHF_2CH_3$, $CHF_2CHF_2$, $CHBrF_2$, $CHClFCF_3$, $CHF_2CClF_2$, $CClF_2CH_3$ and $C_4F_8$; and at least one halocarbon is selected from the group consisting of $CHBrF_2$, $CHClFCF_3$, $CHF_2CClF_2$, $CClF_2CH_3$, $C_4F_8$, $CClF_2CClF_2$, $CCl_2FCF_3$, and $CHF_2CH_2F$, the highest and lowest boiling point halocarbons being nonflammable, and at least three different halocarbons being selected.

5. The refrigerent of claim 1 wherein the first halocarbon is FC-22, the second halocarbon is FC-152a, and the third halocarbon is FC-114, said halocarbons being present in said refrigerant in the proportions of about 30–40%, about 15–25%, and about 30–40%, respectively, by weight of the total refrigerant.

6. The refrigerant of claim 5 wherein the first halocarbon is FC-22, the second halocarbon is FC-152a, and the third halocarbon is FC-114, said halocarbons being present in said refrigerant in the proportions of about 40%, about 20%, and about 40%, respectively, by weight of the total refrigerant.

7. The refrigerant of claim 5 wherein the first halocarbon is FC-22, the second halocarbon is FC-152a, and the third halocarbon is FC-114, said halocarbons being present in said refrigerant in the proportions of about 36%, about 24%, and about 40%, respectively, by weight of the total refrigerant.

8. A method for producing cooling which comprises condensing the refrigerant of claim 1 and thereafter evaporating said refrigerant in a heat exchange relationship with a body to be cooled.

9. A method for producing heating which comprises condensing the refrigerant composition of claim 1 in a heat exchange relationship with a body to be heated and thereafter evaporating said refrigerant.

* * * * *